United States Patent Office 3,743,617
Patented July 3, 1973

3,743,617
URETHANE BASE PRESSURE SENSITIVE
ADHESIVE
Donald O. Kest, 6258 Fairhaven Road,
Mayfield Heights, Ohio 44124
No Drawing. Continuation-in-part of abandoned application Ser. No. 843,750, July 22, 1969. This application May 17, 1971, Ser. No. 144,337
Int. Cl. C09j 3/14, 3/16, 3/26
U.S. Cl. 260—27 BB     26 Claims

ABSTRACT OF THE DISCLOSURE

A pressure sensitive adhesive product is produced by casting on a substrate web, such as paper, plastic film, or metal foil, a layer of an admixture consisting essentially of;
(A) a diene polymer or copolymer having at least 1.6 terminal active-hydrogen groups and an equivalent weight of 500 or more,
(B) an organic polyisocyanate and
(C) at least 75 parts per 100 parts of the diene polymer and the organic polyisocyanate of a tackifying resin or mixture of tackifying resins having a ball and ring softening point of 60° to 140° C. that has been predissolved in the diene polymer, and co-reacting the diene polymer and the organic polyisocyanate in situ on the substrate web to give a pressure sensitive adhesive product. The diene polymer and the organic polyisocyanate, plus any other ingredients coreactive with the diene polymer and the organic polyisocyanate that are used, are chosen so that the pressure sensitive adhesive polymer formed on the substrate web has the character of an elastomer.

RELATED APPLICATIONS

This application is a continuation-in-part of U.S. Ser. No. 843,750 filed July 22, 1969, now abandoned, and is directed to a specific class of pressure sensitive adhesives falling within the generic class of pressure sensitive adhesives described and claimed in U.S. Ser. No. 843,793 also filed July 22, 1969, now abandoned, and its successor, continuation-in-part application, U.S. Ser. No. 144,293, filed May 17, 1971.

BACKGROUND OF THE INVENTION

This invention relates generally to a new class of and method for producing pressure sensitive adhesives. More particularly, this invention encompasses a method of producing a new class of pressure sensitive adhesive products by the in situ formation directly on the product of a solid, elastomeric polymer derived from the reaction of a low-molecular weight, diene polymer having reactive functional groups and a polyfunctional organic compound having functional groups coreactive with the polymer functional groups in the presence of particular types and quantities of tackifying resins, which products have a spectrum of properties unattainable with pressure sensitive adhesives presently known and available to the art.

Pressure sensitive adhesive products encompass typically webs of paper, plastic film or sheets, or metal foils carrying on one side a coating or layer of a solventless, solid adhesive composition that possesses sufficient tackiness or "tack," as it is referred to in the art, to permit such webs of paper, plastic or metal to be adhered to the surface of an object by merely contacting and momentarily pressing the adhesive layer-carrying side of the web directly against the object surface.

In formulating pressure sensitive adhesive compositions, the skilled adhesive artisan is concerned with producing a composition that will have a certain minimum balance of physical and chemical properties so as to be able to withstand the stresses and environment that the product will encounter and be expected to survive in use.

Generally, in the technology of pressure sensitive adhesives, the physical properties known in the art as tack, peel adhesion, and creep resistance are paramount in determining the suitability of any given pressure sensitive adhesive composition to provide the necessary application properties and in-service durability required of the pressure sensitive adhesive product.

The first property, tack, is in effect the instantaneous adhesion of the adhesive layer of the web to the surface of an object that is developed immediately after contacting the web with the surface. One widely accepted method of measuring tack, endorsed by the Pressure Sensitive Tape Council, is test method PSTC–6 evolved and published as a standard test by the council. It involves rolling a stainless steel ball down an inclined plane unto the surface of a pressure sensitive adhesive layer deposited on a horizontal plane, and measuring the distance in inches, the ball rolls across the adhesive. In this test, tack is expressed in inches of ball travel, and this is an inverse function of the distance the ball rolls—high tack adhesive stopping the ball within 0.5 to 3 inches, low tack adhesives allowing the ball to roll more than 12 inches.

The second important property, peel adhesion, is the adhesion of the pressure sensitive adhesive product after the adhesive layer has been in contact with an adherent surface for a sufficient period of time to reach a steady state or equilibrium with the surface. It is normally measured by American Standards Test Method (ASTM) D–903–49, which involves pressing a 1 inch wide strip of an adhesive-coated web unto a test surface, such as a metal or glass plate, allowing the laminate to age under specified conditions of time, temperature and humidity, and then peeling the web from the plate at a 180° angle at a peeling rate of 6 inches/minute. For pressure sensitive adhesive products that are meant to be only temporarily adhered, such as masking tapes and descriptive labels, peel adhesion of two pounds or less is usual. Conversely, products that are to be permanently adhered, such as product, trademark or instruction labels, must exhibit peel adhesion of at least three pounds with levels of five pounds or more being preferred.

The third physical property utilized to define the suitability of a pressure sensitive adhesive product for a given use is its creep resistance. This test measures in essence the durability and permanence of the adhesive bond of the adhered product when subjected to a constant delaminating force, such as would be present when a pressure sensitive adhesive product is adhered to a vertical or convex surface. It is measured by the Pressure Sensitive Tape Council's test method PSTC-7 that consists of overlapping one inch of a one inch wide web unto a test surface, such as a plate of metal or glass, conditioning the test specimen for a specified period under standard temperature and humidity conditions, and then imposing a two pound continuous separation force on the specimen in a direction coaxial to the length of the web in a 90°±0.5° F. air environment, and measuring the time for the web to pull away from the plate. Ideally, pressure sensitive adhesive products, whether removable or permanent, are sought that exhibit no separation. In reality, however, products withstanding 50 hours or more of stress are considered to be superior and with the normal range being 20 to 40 hours.

Besides these physical property parameters, the chemical attributes of the pressure sensitive adhesive composition must also be considered in order to provide a pressure sensitive adhesive product having the requisite durability in the environment in which it is to be used. Thus, for example, the pressure sensitive adhesive must be formulated so as to exhibit resistance to adhesive-degrading environmental conditions such as elevated temperatures, sunlight, organic solvents, moisture, acids, and bases to which the pressure sensitive adhesive product will be exposed in service.

Prior art processes for manufacturing pressure sensitive adhesive products

In the art of pressure sensitive adhesives several processes have been developed for the purpose of producing such pressure sensitive adhesives on a commercially satisfactory basis. One method involves the use of adhesive components that are dissolved in a solvent resulting in a liquid solution. A second method uses adhesive components that are finely divided and suspended in water forming an aqueous dispersion commonly called a latex composition. The solution or latex adhesive composition is applied to a substrate web such as paper, plastic film or metal foil after which heat is applied to remove the solvents or water, leaving only the solid portion of the adhesive on the substrate.

Generally speaking, the former is known as the solvent process of manufacturing pressure sensitive adhesives and the latter is known as the latex process of manufacturing pressure sensitive adhesives. Numerous formulations exist in the prior art for producing pressure sensitive adhesives by these two methods.

The disadvantages of the solvent system and the latex system of producing pressure sensitive adhesives are numerous:

A first disadvantage is the relatively high cost of equipment due to the fact that long and expensive heating ovens are required to evaporate solvent or water in the solvent or latex processes, respectively. In addition, such ovens require sophisticated and expensive web handling equipment and controls. Because of the length of these oven, scrap losses of the substrate web being coated with the pressure sensitive adhesive are high, typically 8 to 10%, bacause of the excessive material needed to initially thread the coating machine and oven and subsequently consumed in establishing the desired coating conditions and adhesive coating weight.

A second disadvantage is the relatively slow speeds at which substrate webs can be coated with solution or latex pressure sensitive adhesives due to the limited speeds at which ovens can remove solvent or water from the adhesive mass, especially if the adhesive layer is thick, e.g., greater than 3 mils.

A third very serious problem is that of air pollution and the cost of its control caused by the volatilization of solvents during the manufacture of solvent-based pressure sensitive adhesives.

A fourth problem is the ever present fire and explosion hazards whenever flammable solvents are used and with some solvents the danger to the health of the workers.

A fifth problem exists with regard to the fact that during the application of the considerable heat required to remove solvents or water, the carrier web can be damaged. For example, a paper web can be demoisturized causing shrinking while a plastic web can be distorted, causing severe problems both from a production standpoint and in the quality of the finished product.

Prior art pressure sensitive adhesive compostions

The oldest and still widely used pressure sensitive adhesive compositions were based on natural rubber as the film former often further compounded with naturally occuring resinous products such as resin and coal tar pitch to enhance tack and peel adhesion and plasticizing petroleum oils to increase flow properties of the adhesive. Later, when synthetic butadiene and butadiene-systrene rubbers were developed, they were used to replace all or part of the natural rubber in pressure sensitive adhesive compositions.

Pressure sensitive adhesives based on these 100% hydrocarbon polymers (i.e. natural or synthetic butadiene type) and usually referred to as conventional pressure sensitive adhesives, presently constitute the largest share of the total pressure sensitive adhesive market because of their low cost and their overall balance of desirable properties. For example, these conventional pressure sensitive adhesives can be compounded to give an acceptable level of adhesion to a wide variety of surfaces, both of a nonpolar nature such as polyethylene, polypropylene and dirty surfaces (i.e. having a layer of contaminating oil) and of a polar nature such as metal, glass, polyvinyl chloride and so forth. Typical of the range of properties that can be obtained are: tack 0.5 to 3 inches, peel adhesion ¾ to 4 pounds and creep resistance of 20 to 40 hours depending on the tack and peel adhesion values.

However, such conventional pressure sensitive adhesives are not universally acceptable because of poor chemical resistance in evironments such as oils, hydrocarbon solvents, oxidizing acids, high temperatures and sunlight that cause the pressure sensitive adhesive products to fail prematurely or to be deficient in adhesive bond strength.

In and effort to overcome their environmental deficiencies, the adhesive technologist has produced pressure sensitive adhesives from more polar rubbers such as polychloroprene or butadiene acrylonitrile copolymers that inherently have greater chemical resistance to such hydrocarbon rubber degrading environments. While such polar rubbers provide pressure sensitive adhesives with better ability to withstand such environments as exposure to hydrocarbon solvents, elevated temperatures and oxidizing acids and to some extent, sunlight, these improvements were not obtained without sacrifice of the equally important properties of tack and peel adhesion. Generally, it is observed in the tack testing of these polar pressure senstitive adhesives that the ball travel in the PSTC-6 test is 12 inches or more, a figure four times poorer than the poorest tack of conventional hydrocarbon polymer-based pressure sensitive adhesives. Further, even poorer tack is observed at low temperatures such as 50° F. or less. At the same time, while respectable peel adhesion, e.g. 4 to 6 pounds, and creep resistance, e.g. 30 to 70 hours, can be obtained, such adhesion values are only observed when the polar-type pressure sensitive adhesives are applied to polar surfaces such as metal or glass, it being impossible within the knowledge of the present state of the art to formulate them so as to be adhesive to nonpolar surfaces such as polypropylene, even though there is a present need for their improved environmental resistance properties in applications involving nonpolar adherent substrates.

A further serious drawback of the polar-type pressure sensitive adhesive is economic. The polar polymer employed requires more expensive tackifying resins and considerably more expensive solvents such as methyl ethyl ketone and tetrahydrofuran.

In an effort to obtain better peel adhesion and creep resistance properties and even greater resistance to heat and especially sunlight exposure, there has been developed within the last fifteen years, pressure sensitive adhesive formulations based on vinyl polymers having inherent UV and heat resistance, principally polymers based on the acrylate monomers such as methyl methacrylate, ethyl acrylate and so forth. Here again, however, the adhesive technologist was thwarted in his attempt to provide a universally excellent pressure sensitive adhesive. While excellent sunlight and heat resistance were obtained, tack was even poorer than the polar pressure sensitive adhesive exhibiting 15 inches or more of ball roll in the PSTC-6 test. In addition, tack was similarly temperature dependent, being almost non-existent at temperatures below 40° F. Further, while improved peel adhesion, e.g. 5 to 8 pounds, and creep resistance, e.g. no failure after seven days of testing, could be obtained, pressure sensitive adhesives based on acrylate ester polymers, like the polar pressure sensitive adhesive, only show these improved adhesion characteristics to polar surfaces, again leaving a large spectrum of potential applications involving non-polar substrates to be served only with conventional hydrocarbon-based pressure sensitive adhesives having the poor environmental resistance characteristics hereinbefore described.

Another type of polar-type pressure sensitive adhesives that evolved were based on polyurethane derived from the condensation of a polyether or polyester polyol with a polyisocyanate in the presence of a limited amount of a tackifying resin and plasticizer. For example, U.S. Pat. 3,437,622 (Dahl) exemplifies and claims the reaction of polypropylene ether glycols having molecular weights of 400 to 3,000 and/or polypropylene ether triols having molecular weights of 3,000 to 10,000 with organic diisocyanates in the presence of 2 to 10% by weight of the polyol of selected tackifying resins and 5 to 25% of a compatible plasticizer.

A subsequent patent of Dahl, U.S. Pat. 3,515,773, claims that internal strength and tackiness can be produced by replacing the tackifying resins with liquid, hydroxyl-terminated butadiene polymers or copolymers (25% styrene or 15% acrylonitrile). The examples of U.S. Pat. 3,437,622 while alleging the formulation of tacky adhesives, do not give any indication of the numerical values of tack or peel adhesion that can be obtained. However, based on the teachings of column 4, lines 4 to 7 and 37 to 40 relating to the lack of internal cohesive strength and nontackiness to itself, and applicant's past experience with similar polyurethane pressure sensitive adhesives, it is believed that the adhesive taught in U.S. Pat. 3,437,622 cannot be formulated to give a desired balance of tack, peel adhesion, creep resistance, and environmental resistance, and further that excellence in one or two of these properties can only be obtained at a commercially unacceptable sacrifice of the other properties. U.S. Pat. 3,515,733 is similarly vague with regard to the actual physical parameters of the pressure sensitive adhesives that are illustrated in Examples 1 to 3. In general, however, based on its high content of the same polyurethane polymers, viz 90% to 97%, exemplified in U.S. Pat. 3,437,622 it is believed that the pressure sensitive adhesives therein disclosed would have the same infirmities and particularly the inability to provide pressure sensitive adhesives having a balance of the critical properties of high tack and peel adhesion and good creep resistance and environmental resistance. Further, because of the polar nature of the polyether urethane employed, the pressure sensitive adhesives disclosed in both U.S. Pat. 3,437,622 and 3,515,733 would be expected to exhibit poor adhesion to non-polar substrates and hence be excluded from such applications.

U.S. Pat. 3,246,049 discloses that pressure sensitive adhesives can be made from polyurethanes derived from the interaction of a castor oil/diglycolic acid polyester and a polyisocyanate used either by themselves or in combination with tackifying resins. Example B illustrates the use of 45 parts of a phenolated terpene resin, while Example G shows the incorporation of 33 parts of an alpha pinene polymer per 100 parts of the polyurethane. The disclosure of column 1, lines 50 to 53 and the quick stick values of the pressure sensitive adhesives of Examples F to K shown in column 3, lines 70 to 73, again demonstrate that presently known polyurethane pressure sensitive adhesives do not provide excellence in certain properties without sacrificing other equally important physical properties such as peel adhesion. Similarly, because of the polar nature of the urethane polymers used in U.S. Pat. 3,246,049, it would not, it is believed, give pressure sensitive adhesives exhibiting that degree of adhesion to non-polar surfaces that would be required for commercial acceptance.

Beyond the above enumerated inherent limitations of the different types of pressure sensitive adhesives presently known in the art, the adhesive technologist is confronted with the problem of continually upgrading the properties, both physical and chemical, of pressure sensitive adhesives so as to allow pressure sensitive adhesive products to be used in new applications having ever more stringent and demanding requirements. In his effort to do so, however, he is confronted with a phenomenon, previously alluded to, that is often observed in the technology of formulating compositions that are to meet a spectrum of specified physical and chemical properties, namely, that to obtain excellence in one or more properties, other equally critical properties must be compromised. Thus, at the present state of the art, the adhesive technologist in formulating pressure sensitive adhesives exhibiting outstanding creep resistance especially at higher temperatures, e.g. 150° F. and more, usually does so at the expense of decreased tack and possibly peel adhesion depending on the type of adhesive. Similarly, improved tack presently can only be obtained usually by sacrificing the creep resistance and possibly the peel adhesion of the pressure sensitive adhesive product. Finally, when higher peel adhesion is the goal, then lower creep resistance and sometimes tack usually results.

A similar tradeoff in the form of decreased physical properties is often observed when pressure sensitive adhesives are formulated to enhance chemical properties to improve environmental resistance characteristics of pressure sensitive adhesive products.

As a consequence of these inherent limitations of the current pressure sensitive adhesive technology, pressure sensitive adhesive products in many instances represent a compromise of physical and chemical properties just able to meet the specification requirements of the end use, while in other instances failing to have all the necessary properties but still being used because nothing better is available.

For example, presently available, removable, pressure sensitive adhesive labels have only 5 to 10 minutes creep resistance, thus giving rise to what is known as label flagging when the edges delaminate from an adhered surface. To date, efforts to provide a pressure sensitive adhesive having an ideal of 10 hours or more creep resistance, have been frustrated because peel adhesion is also raised beyond the one pound maximum that will allow the label to be cleanly stripped off without internal failure of the label stock which typically has a cohesive strength of only about 0.75 pound. Another example of an unsatisfactory pressure sensitive adhesive compromise resides in the production of removable pressure sensitive adhesive products that are based on conventional rubber-resin compositions and are applied to plastic films or metal foils where it is generally necessary to employ a primer coating to ensure that the adhesive layer will not transfer to the adhered surface when the product is removed. Attempts to reformulate the pressure sensitive adhesive to eliminate the need for a primer result in products that are deficient in either peel adhesion (too high), creep resistance or tack.

Still another example of pressure sensitive adhesive products that are less than satisfactory are premanent-type, pressure sensitive adhesive products meant to be adhered to nonpolar surfaces such as polypropylene or any type of surface contaminated with oil. Utilizing currently available materials, it is not possible to produce pressure sensitive adhesive products having high adhesive permanence with retention of acceptable environmental stability.

SUMMARY OF THE INVENTION

Bearing in mind this present sate of the technology of pressure sensitive adhesives hereinbefore described, it is a principal object of this invention to provide a new class of pressure sensitive adhesives that minimizes or in some instances eliminates the limitations and deficiencies of presently used pressure sensitive adhesive compositions and a method for their production that obviates in part or sometimes completely, the disadvantages of manufacturing processes currently used to prduce solvent or latex pressure sensitive adhesive products.

More specifically, it is an object of this invention to provide a method of producing pressure sensitive adhesive products that eliminates or greatly reduces the need for solvents and their attendant disadvantages including pollution of our environment, combustibility, toxicity and increased costs.

A further object of the invention is the provision of a process that, even when some solvents are employed, requires simpler and less expensive heating means, e.g. ovens, to achieve production speeds equal to the 50 to 150 feet/minute normal today for solvent-produced pressure sensitive adhesives, or conversely, if conventional heating means are used, permits the production of pressure sensitive adhesive products at faster speeds, e.g. 2 to 3 times more rapidly.

Another object is to provide a process of manufacturing pressure sensitive adhesive products that reduces the amount of scrap that is generated.

A still further particular object is the provision of pressure sensitive adhesive compositions, having wide latitude in their ability to provide an overall balance of physical and chemical properties characteristics of those obtained with both nonpolar and polar-type pressure sensitive adhesives.

Yet another specific object is the provision of a pressure sensitive adhesive composition and process that eliminates the need for a primer on removable pressure sensitive adhesive products to prevent the transfer of the adhered surface when the product is removed therefrom.

A further object is to provide adhesive compositions for removable pressure sensitive adhesives that have a low order of peel adhesion and yet high resistance to creep and which permit the production of removable pressure sensitive adhesive webs that adhere firmly to an object without edge separation but can be stripped off without cohesive failure of the web.

A still further object is to provide a pressure sensitive adhesive system having good adhesion to polar surfaces such as metal and glass that maintains its tack at low temperatures, e.g. less than 40° F.

Yet another objective is the provision of a pressure sensitive adhesive that resists plasticizer migration when in contact with a plasticized polyvinyl chloride web or adhered surface.

In the following description and claims, the quantities of the ingredients are expressed in parts by weight unless otherwise indicated.

These and other objects and advantages of my invention, which will be apparent to those skilled in the art from the following description, are obtained by my invention which comprises in its simplest basic embodiment forming in-situ on a pressure sensitive adhesive product substrate a layer of a pressure sensitive adhesive composition derived principally from the coreaction of a liquid, low-molecular weight, hydrocarbon-backbone polymer having an average of at least about 1.6 terminal, isocyanate-reactive, groups per molecule and an organic polyisocyanate to produce an elastomeric in-situ formed polymer, in the presence of at least 75 parts, per 100 parts of the in-situ formed polymer, of a tackifying resin that has a softening point between about 60° C. and 140° C. and is soluble in the liquid polymer at 25° C., and that further is predissolved in the liquid polymer prior to its reaction with the polyisocyanate.

DESCRIPTION OF THE PREFERRED EMBODIMENTS

In particular the low-molecular weight, hydrocarbon-backbone polymer, hereinafter referred to as the diene telechelic polymer, that is utilized in the practice of this invention is a liquid or quasi-liquid polymer derived from the polymerization of butadiene, isoprene, piperylene, chloroprene or mixtures thereof, or copolymers derived from the random copolymerization of butadiene, isoprene, piperylene, chloroprene or mixtures thereof with up to 33% by weight of a copolymerizable vinyl monomer free of active hydrogen groups capable of reacting with an isocyanate, which polymer has a terminal hydroxy, mercapto, amino, or carboxyl groups (hereinafter called active hydrogen groups) attached to one of the last three carbon atoms at the end of the polymer chains, and an average of at least about 1.6 of such active hydrogen groups per polymer molecule. Depending on its method of synthesis, it is possible to obtain and use a diene telechelic polymer having a branched structure and thus more than two chains having such terminally located active hydrogen groups. While diene telechelic polymers having as many as four active hydrogen groups can be used, it is preferred to use polymers having no more than three per polymer molecule to give the viscoelastic flow properties required in the invention pressure sensitive adhesives.

Further, to provide pressure sensitive adhesvies having the necessary elasticity and compatibility with tackifying resins, the polymer should have an average equivalent weight (molecular weight of the polymer divided by the number of active hydrogen groups in the polymer) of at least about 500. For maximum compatibility and physical properties, polymers having an average equivalent weight of about 800 or more are preferred. The maximum equivalent weight of polymes that are capable of producing acceptable pressure sensitive adhesives, as a rule, will not exceed 3,000 and usually 2,000 to 2,500 is the normal upper limit. Bearing in mind the parameters of functionality and suitable equivalent weight, it can be seen that the molecular weight of the deine telomer can vary from as low as about 800 up to a useful maximum of about 12,000.

Generally, when maximum resistance to a solvent environment is desired, diene telechelic polymers having up to about 25% by weight of randomly copolymerized polar monomers such as acrylonitrile; methacrylonitrile or methacrylamide will be used. Pressure sensitive adhesives having improved sunlight resistance and heat resistance are obtained by using diene telomers containing up to about 33% by weight of randomly copolymerized acrylate esters such as methylmethacrylate and ethyl acrylate. Lower cost and/or modification of pressure sensitive adhesive properties can be obtained by using diene telechelic polymers containing up to about 33% by weight of randomly copolymerized vinyl aromatic monomers such as styrene, and methyl styrene and vinyl pyridine. As a general rule, however, maximum latitude with regard to formulating with different types of tackifying resins to produce a broad spectrum of pressure sensitive adhesives, as described hereinafter, is obtained when the diene telechelic polymer is derived from monomers consisting essentially of butadiene, isoprene, piperylene or mixtures thereof and hence, for most embodiments of the invention, constitute the preferred material. Similarly, while satisfactory pressure sensitive adhesives can be made with diene telomers having mercaptan amino and carboxyl end groups, more flexibility in formulating pressure sensitive adhesives having the desired processing characteristics and physical properties can be obtained with diene telomers having hydroxyl end groups and consequently are preferred in the practice of this invention.

Diene telechelic polymers of the above description and methods for their synthesis are well known, being shown for example in U.S. Patents 2,877,212; 3,134,745; 3,135,716; 3,190,848; 3,285,949; 3,308,170 and 3,410,836.

As some of these references show, diene telechelic polymers useful in this invention may contain, in addition to monomer and initiator, divalent radicals of low-molecular-weight coupling compounds which, in some instances, introduce into the diene telechelic polymer chain, groups containing O, S or N atoms such as carbonyl, ether, ester or amide groups. Where they are present, the minimum molecular weight of the diene polymer segment or diene-vinyl copolymer segment between the coupling compound radical preferably is about 500 or more to insure proper adhesive viscoelastic properties and resin compatibility in the pressure sensitive adhesives of this invention. The above described diene telechelic polymers can be used either singly or two or more can be used together, if desired, to give pressure sensitive adhesives having special properties.

In the pressure sensitive adhesives of this invention, up to about 35 percent by weight of the diene telechelic polymer can be replaced by a reactive polyether and/or a polyester, miscible with the diene telechelic polymer, having about 1.6 to 4 hydroxyl, carboxyl amino or mercaptan groups, a melting point below 60° C. and preferably below 50° C., and an equivalent weight of from about 400 up to about 1,500, which, when admixed with the diene telechelic polymer and coreacted with the polyisocyanate employed in the invention pressure sensitive adhesive, produces a rubber-like copolymer. Because of their latitude in formulating the invention pressure sensitive adhesives and further considering their ease of synthesis and commercial availability, polyether or polyesters having predominantly or only hydroxyl groups are preferred. Exemplary of suitable polyethers are polyethylenepropylene ether polyols, polypropylene ether polyols, and polytetramethylene ether polyols such as are shown in U.S. Patent 2,929,800. Typical of polyesters that may be used are those derived from the condensation of polyols such as ethylene glycol, 1,4-butandiol, isopropylene glycol and glycerine with polycarboxylic acids such as succinic acid, adipic acid, sebacic acid and phthalic acid or those derived from the polymerization of caprolactone. Generally, maximum compatibility with tackifying resins and nonsensitivity to water in the invention pressure sensitive adhesives is obtained by the use of polyethers or polyesters having an average of about 3 or more carbon atoms per oxygen atom in the polymer chain and consequently are preferred. Either a single reactive polyether or polyester or mixtures thereof can be used in the invention pressure sensitive adhesives.

Besides the diene telechelic polymer and the reactive polyether or polyester, there can be employed in the pressure sensitive adhesives of this invention, lower-molecular-weight, reactive, chain-extending or crosslinking compounds having a molecular weight usually of about 300 or less and 2 to 4 functional groups reactive with an isocyanate such as hydroxyl, carboxyl, amino, or mercaptan groups with hydroxyl groups being preferred for maximum latitude in formulating the invention pressure sensitive adhesives. Typical of such extending or crosslinking compounds that may be used either alone or in combination are ethylene glycol, 1,4-butanediol, 1,4-cyclohexane glycol, trimethylol propane, pentaerythritol, N,N-bis-(2-hydroxypropyl) aniline, adipic acid, succinic acid, terephthalic acid, ethanol amine, piperazine, hydrazine, propylene diamine, 4,4'-methylene bis-(2-chloroaniline), 3,3'-dichloro benzidine, 4,4'-diamino-diphenylmethane and 2,4- and 2,6-toluene diamines. When desired, water can be used with an excess of the polyisocyanate to generate a polyamine in situ. The quantity of extenders or crosslinking compounds that may be used cannot be rigidly delineated because it depends not only on the structure, molecular weight and functionality of the extender or crosslinker but also on factors such as the equivalent weight and composition of the diene telechelic polymer and the reactive polyether and polyester, if used, as well as the type and quantity of polyisocyanate that is employed in producing the invention pressure sensitive adhesives. All of these factors are interdependent in determining whether the polymer produced will have the necessary viscoelastic properties required of the pressure sensitive adhesives of this invention as more fully described hereinafter. Bearing in mind, these observations, it has been found that up to about 2.0 equivalent weights of some extender compound may be used per equivalent weight of the diene telechelic polymer or of the combined diene telechelic polymer and polyether and/or polyester. When it is desired to use crosslinking compounds having more than two active hydrogen groups, then generally not more than about 1.5 equivalents per equivalent of the diene telechelic polymer will be used if a satisfactory pressure sensitive adhesive is to be obtained and generally, about 0.8 equivalent or less will be utilized. Such extending or crosslinking compounds are especially useful in the invention pressure sensitive adhesive composition when the ratio of isocyanate to active hydrogen is below about 0.90, when the functionality of the diene telechelic polymer and/or the reactive polyester or polyester is less than about 1.8 or when the equivalent weight of the diene telechelic polymer and/or the reactive polyether or reactive polyester is about 1,500 or more. In these instances, their use provides means for insuring that the in-situ-formed pressure sensitive adhesive polymer has the desired elastomer-like properties.

Organic polyisocyanates that may be used in forming the pressure sensitive adhesives of this invention include aromatic, aliphatic and cycloaliphatic isocyanates, as for example 2,4-toluene diisocyanate, 2,6-toluene diisocyanate, p-phenylene diisocyanate, 4',4'-biphenylene diisocyanate, p,p' methylene diphenyl diisocyanate, polymethylene polyphenylisocyanate, triphenylmethane tri-isocyanate, hexamethylene diisocyanate and methylene dicyclohexyl-4,4'-diisocyanate. These and other polyisocyanates may be used either singly or in combination. To prepare pressure sensitive adhesives having the proper viscoelastic character, a major portion of the total isocyanate requirement usually will be provided by organic diisocyanates. In the practice of the invention, sufficient polyisocyanate is used to provide a ratio of isocyanate groups to the total of the active hydrogen groups present in the diene telechelic polymer, and when used, the reactive polyester or polyether and extending or crosslinking the compound of from about 0.75 to 1.20. Normally, ratios between about 0.95 and 1.12 are preferred for most pressure sensitive adhesive applications to provide an optimum balance of properties. A ratio of less than about 0.75 produces pressure sensitive adhesives that have poorer cohesive strength, poorer creep resistance, increased tendency to transfer from the substrate web to the adhered surface, and finally increased sensitivity to environmental degradation. Conversely, when the ratio exceeds more than about 1.20, the invention pressure sensitive adhesives have been observed to exhibit poor tack and peel adhesion at low temperatures (e.g. 40° F. or less) and to be incapable of giving good adhesion to rough surfaces due, it is believed, to reduced viscoelastic flow properties. In formulating the invention pressure sensitive adhesives, water, if used, is considered to require one equivalent weight of the organic polyisocyanate per mole of water that is desired to use in the formation of the in-situ pressure sensitive adhesive elastomer, which as previously discussed, will not generally be more than about 2.0 moles of water per equivalent of the diene telechelic polymer.

In some instances, it is advantageous to include in the pressure sensitive adhesive formations of this invention, a minor quantity of monofunctional organic regulating compound having either a single isocyanate group or a single active hydrogen group to regulate the degree of branching and/or crosslinking of the pressure sensitive adhesive polymer and hence its viscoelastic properties when the average functionality of all the active-hydrogen containing reactants and the polyisocyanates being used greatly exceeds an average value of about 2.4. Depending upon this value, from about 1% to about 10% equivalents of the monofunctional regulating compound may, for example, be needed per equivalent of either the active hydrogen-containing reagent or organic polyisocyanate present.

It has been observed that the pressure sensitive adhesives of this invention having the desired balance of physical and chemical properties are obtained when the aforedescribed diene telechelic polymer, organic polyisocyanate and when used reactive polyether, polyester, extender, crosslinker, and monofunctional regulating compound are selected with reference to their composition and quantities so as to provide, when reacted together, an in-situ-formed polymer having elastomeric-like properties. Thin films (12 to 20 mils) of the polymer cast from a 75% total solids solution, which had been vacuum deaerated, that were dried and cured 10 min. at 175° F. and four days at room temperature give an elongation at break in excess of 100% employing a standard ASTM ¼" wide test dumbbell specimen at a test speed of 12 inches per minute. When a 1 x 6 inch test specimen of film of the polymer having about 15 mils thickness, prepared as above, was elongated 100% at 20 inches per minute and immediately allowed to retract at a similar speed, the hysteresis loss $$\frac{\text{(energy of elongation} - \text{energy of retraction} \times 100)}{\text{energy of elongation}}$$

was found to be 30% or less and for the best pressure sensitive adhesives to be in the range of 5 to 10%. In all instances, the hysteresis test samples after testing retracted to within 5% of their original length.

It has been discovered that acceptable pressure sensitive adhesives within the scope of this invention can only be produced when at least about 75 parts of a tackifying resin or mixture of tackifying resins, having the particular characteristics hereinafter described, are employed per 100 parts of the polymer formed by the in-situ coreaction of the organic polyisocyanate with the diene telechelic polymer and, when utilized, the reactive polyester, polyether, extender and crosslinking compound.

To provide the pressure sensitive adhesives of this invention having an improved balance of tack, peel adhesion and creep resistance, it is necessary that virtually all of the tackifying resin or mixture of tackifying resin employed be soluble in the diene telechelic polymer or when reactive polyether or polyester are used in their admixture with the diene telechelic polymer to give solutions that are essentially haze-free after being conditioned 24 hours at 25° C. In making this solubility determination, the temperature of the diene telechelic polymer or its admixture with the reactive polyether or polyester can be raised, e.g. to 160–200° F., to facilitate the solvation of the tackifying resins after which the temperature is lowered to 25° C. for the 24-hour period of conditioning. Additionally, to provide the necessary pressure sensitive adhesive properties, the tackifying resin or mixture of tackifying resins used should have a ball and ring softening point of between about 60° C. and 140° C. Representative of resins of this description which may be used are rosin, hydrogenated rosin, polymerized rosin, pentaerythritol esters of hydrogenated rosin, glycerol ester of hydrogenated rosin, glycerol ester of polymerized rosin, phenol-modified pentaerythritol ester of rosin, maleic anhydride-modified rosin and rosin derivatives, oil-soluble phenol-aldehyde resins, terpene phenolic resins, polymerized pinens and polymerized $C_5$ hydrocarbon resins. When it is desired to produce pressure sensitive adhesives having adhesion to polar surfaces, the invention pressure sensitive adhesives should be principally formulated with one or more tackifying resins having somewhat of a polar character such as rosin, the rosin derivative resins, and the phenol-containing resins. Conversely, when adhesion to nonpolar substrates is required, then the major portion of the tackifying resins should be one or more of the nonpolar types such as the polymerized pinenes and the polymerized hydrocarbon resins. Generally, it is observe that both the nonpolar and the somewhat polar resins are compatible to the desired extent in the diene telechelic homopolymers and in the diene telechelic copolymers made with only slightly polar vinyl monomers such as the vinyl aryls and the acrylate esters. However, when it is desired to produce a pressure sensitive adhesive from a diene telechelic copolymer made with any appreciable quantity, e.g. 10 mole percent or more, of the more polar vinyl monomers such as acrylonitrile or methacrylamide, then it may be necessary that a considerable portion, e.g. 30 weight percent or more and in some instances a major portion of the tackifying resins utilized, be provided with more polar-type tackifying resins, as for example, those formed by the condensation of formaldehyde with an aliphatic or cyclic ketone such as methyl ethyl ketone, methyl isopropyl ketone, cyclobutanone and cyclohexanone. While the upper limit of tackifying resin cannot be precisely delineated, in most pressure sensitive adhesive formulations, not more than about 130 parts per 100 parts of the in-situ formed pressure sensitive adhesive polymer will be utilized.

For many applications, it is advantageous to further incorporate in the invention pressure sensitive adhesives from about 1 to 30 parts per 100 parts of the in-situ-formed elastomer of a plasticizer having a polar character to increase its tack properties. Specifically, it has been found that primary or secondary plasticizers for plastic resins such as polyvinyl chloride, polyvinyl acetate, and so forth will impart increased tack to the invention sensitive adhesives. Illustrative of plasticizers that may be used are dioctyl phthalate, n-octyl n-decyl adipate, tricresyl phosphate, chlorinated paraffin, chlorinated cyclic hydrocarbons, dioctyl sebacate, low-molecular weight polyesters, low-molecular weight, liquid polyvinyl ethyl ether and so forth.

Conversely, when it is desired to diminish the peel adhesion of the invention pressure sensitive adhesives as for example in the production of removable labels, nonpolar hydrocarbon oils such as the paraffinic and naphthenic mineral oils will be used in the range of about 30 to 60 parts per 100 parts of the in-situ-formed elastomer.

Additionally, in the process of this invention, a catalyst may be used to accelerate the in-situ formation of the pressure sensitive adhesive on the substrate web or the formation of an intermediate prepol as discussed hereinafter. Usually about 0.1 to 1.0 part, per 100 parts of the total elastomer precursor reactants, of a catalyst such as dibutyl tin dilaurate, stannous octoate, dimethyl-aniline and so forth will provide the desired increase in the co-reaction of the polyisocyanate with the telechelic diene polymer and, if used, the reactive polyether or polyester, extender and crosslinking compound. While a single catalyst is most usual, mixed catalyst systems may be required in certain cases to achieve special properties.

Conversely, sometimes, it may be necessary to utilize a minor quantity of an acid inhibitor such as p-toluene sulfonic acid, chloracetic acid, oxalic acid and so forth to neutralize any basic impurities present in the elastomer precursor reactants such as the reactive polyester and polyether which are often synthesized with basic type catalysts.

To facilitate the admixing of the pressure sensitive adhesive ingredients and its subsequent application to the substrate web, there may be used a minor quantity of an organic solvent capable of solvating all the pressure sensitive adhesive ingredients. Especially useful are such polar-like solvents as toluene, xylene, methylisobutyl ketone, methylethyl ketone and butyl acetate. In some cases, it is possible to substitute for the polar-like solvents used up to about 50 percent by weight of a nonpolar solvent such as heptane, hexane and naphthalene. Besides reducing viscosity, the solvent is of further benefit in increasing the pot life of the admixed pressure sensitive adhesive ingredients, thus permitting more flexibility in factory processing operations. Usually 5 to 10 percent by weight dilution of the admixed pressure sensitive adhesive ingredients will be sufficient to achieve these desired results. However, when a high-molecular-weight diene elastomer, as hereinafter discussed, is also employed in the invention pressure sensitive adhesives, then as much as 40% to 45% by weight solvent may be required to provide proper viscosity.

An especially unique and valuable embodiment of this invention resides in the use of up to about 90 parts, per 100 parts of the in-situ-formed pressure sensitive adhesive elastomer of a diene elastomer, which is compatible therewith, in the pressure sensitive adhesive composition to accelerate the solidification of the pressure sensitive adhesive after it has been applied to the substrate web. Particularly effective are the styrene-butadiene or styrene-isoprene type block copolymers having the styrene-type segments terminally located such as is disclosed in U.S. Patent 3,239,478 or the diene segment terminally located as is disclosed in British Patent No. 888,624.

Other diene elastomers that may be used are natural rubber, polyisoprene and random copolymers of styrene and butadiene having a mooney viscosity of about 35 to 90 (ML–4'–212° F.). When at least about 15 parts and preferably from about 25 to 60 parts of such diene elastomers are utilized, it is possible to wind up the substrate web into a roll, after the pressure sensitive adhesive has been cast on the web and the solvent essentially all removed, where the balance of the in-situ formation of the pressure sensitive adhesive elastomer can occur during storage on the roll at ambient temperatures without the adhesive layer flowing to give uneven adhesive thickness and hoop-stress lines caused by the ever present variation in wind-up torque. A further valuable contribution imparted by the presence of the diene elastomer in this embodiment of the invention pressure sensitive adhesive is that it markedly reduces the sensitivity of the composition to impurities present in the ingredients, such as water, which can adversely affect the active hydrogen group/isocyanate stoichiometry, thereby permitting the day-in and day-out factory production of pressure sensitive adhesive products having uniform and consistent properties. When diene elastomers are used, the quantity of tackifying resins should be increased. In the case of the block-type diene elastomer, it is increased an amount such that the ratio of the tackifying resin to elastomer (i.e. the total of the diene elastomer and the in-situ formed elastomer) is approximately the same as would be used in its absence to give the desired adhesive properties. When a diene elastomer homopolymer or random copolymer is used, sufficient additional tackifying resin is used so that the ratio of added resin to the diene elastomer is at least 0.6. It may be desirable to similarly increase other materials used in the invention pressure sensitive adhesive to compensate for the dilution effect of the diene elastomer.

In addition to the above described ingredients, other adjuvant materials, commonly utilized in pressure sensitive adhesive compositions, may be employed in essentially the same manner in the pressure sensitive adhesive of this invention, such as antidegradants, UV-stabilizers, optical whiteners, color pigments and dyes, adhesion promoters, reinforcing pigments and filler pigments, to impart their special properties as is well known to those skilled in the adhesive arts.

In the practice of the invention process, the ingredients of the pressure sensitive adhesive may be combined and admixed in any order and by any means that provides a final homogenous liquid admixture and further provides sufficient time to transport the liquid admixture from the admixing means to the casting means and its subsequent casting unto the substrate web before any appreciable thickening or solidification occurs. Bearing in mind these requirements, it is necessary in preparing the pressure sensitive adhesive products of this invention to first dissolve all solid ingredients that are soluble, such as tackifying resin, diene elastomer, anti-degradant, extender or crosslinking agent, and homogeneously predisperse any solid ingredients such as color pigment, reinforcing pigment or filler pigment into part or all of the diene telechelic polymer and/or the reactive polyether, polyester or solvents if present. When a diene elastomer is employed, some or all of the solid insoluble ingredients may advantageously be predispersed in it on rubber mixing equipment such as a Banbury or rubber mill, prior to solvating it. After the presolvation and predispersion of the solid ingredients, any remaining liquid ingredients and the organic polyisocyanate are added either incrementally or in one addition and homogeneously dispersed. When a stoichiometric excess of organic polyisocyanate is first added to and permitted to react with a part of the total diene telechelic polymer and/or reactive polyether or polyester, if present, then an isocyanate prepol is formed which minimizes isocyanate toxicity and facilitates handling, proportioning and subsequent admixing in factory processing operations and is consequently a preferred mode of practicing the invention process. Alternatively, when these benefits are not required, then all of the ingredients after presolvation and predispersion of the solid ingredients may be admixed at one time employing the "one-shot" process to form the final pressure sensitive adhesive composition. As will be known to those skilled in the art, when extremely reactive extenders or crosslinking agents or "hot" catalysts are employed, they are desirably added last to ensure a satisfactory admixing of the other ingredients.

After all of the ingredients of the invention pressure sensitive adhesive composition have been homogeneously admixed, the liquid admixture is applied to a substrate web which could be paper, plastic film, metal foil, release paper and so forth, by any conveniental casting means that is capable of metering and applying the desired thickness uniformly across the web such as a wire-wound rod, a knife coater, a reverse roll coater and so forth. If solvents are present, the coated substrate web is then desirably heated to accelerate solvent removal and initiate the in-situ formation of the solid pressure sensitive adhesive by heating means such as a circulating hot air oven, infrared heaters or heated drums. The coated web is then wound-up on a storage roll where the in-situ formation of the invention pressure sensitive adhesive occurs within a few hours at elevated storage temperature (e.g. 120° to 180° F.) or within one to seven days at ambient temperatures depending upon the reaction kinetics of the particular formulation being used. When solvent is not present, then heating prior to windup of the web is optional depending on the nature of the substrate web, the pressure sensitive adhesive formulation and the desired end product. For webs and formulations subject to considerable hoop stress variations in the roll, which can cause visable adhesive layer thickness variations, then the pressure sensitive adhesive layer should be partially set up or solidified by a prewind-up heating to an extent that will prevent any appreciable flow of the adhesive layer and the consequent introduction of hoop stress lines in the product during storage on the roll.

When the invention pressure sensitive adhesive is first applied to a release paper rather than directly to the end-product substrate web, such as a plastic film or metal foil, then the adhesive-coated release paper and the end-product substrate web are laminated together to form a sandwich having the adhesive centrally located prior to being wound up. Normally, highest adhesion between the end-product substrate web and adhesive is obtained when they are laminated together prior to completion of the in-situ formation of the pressure sensitive adhesive layer deposited on the release paper.

For pressure sensitive adhesive products having no release paper but rather relying on the release properties of the side of the end-product web opposite the coating, then it may be desirable in some instances to, in essence, complete the in-situ formation of the invention pressure sensitive adhesive prior to wind-up in a storage roll to ensure that the adhesive layer preferentially adheres to the coated side of the web and releases from the opposite side when the product is subsequently unwound for use. Thus, however, may not be necessary when the opposite side of the product web is pretreated with a release coating.

Because, at most, only a minor quantity of the total elastomer in the pressure sensitive adhesive compositions of this invention is provided by a solid elastomer, viz. a maximum of 90 parts of the diene elastomer per 100 parts of the in-situ formed elastomer, and further because of the limited solvent employed, viz. about 45% or less solvent by weight of the liquid pressure sensitive adhesive composition being cast, it is possible to dry the liquid pressure sensitive adhesive compositions, after casting on the substrate web when solvent is present, considerably faster than conventional pressure sensitive adhesives based entirely on a solid elastomer, free of voids and bubbles. As a consequence of this property, the pressure sensitive adhesives of this invention may be dried with shorter length heating means, or conversely, if conventional heating means are used, more rapidly.

EXAMPLES

In Examples 1 to 10 tabulated in the following table to illustrate various embodiments of the pressure sensitive adhesives of this invention, all parts are by weight. The final pressure sensitive adhesive compositions were prepared by homogeneously admixing Part A, consisting in the main of the diene telechelic polymer and the tackifying resin, with Part B, consisting essentially of the polyisocyanate. In all of the examples, Part A was made by predissolving the tackifyng resin in the diene telechelic polymer and then adding and homogeneously dispersing the balance of the ingredients. In Examples 3 and 10 the diene elastomer, Kraton 1107 employed was predissolved in the heptane and toluene solvents prior to being admixed with Part A. Examples 1 and 4 to 10, Part A was allowed to age for a period of time after the monoisocyanate, Mondur O, had been added to the diene telechelic polymer to allow essentially complete reaction therewith before admixing with Part B. In Examples 2, 3, and 10, the organic polyisocyanate of Part B was prereacted with part of the telechelic polymer to form an isocyanate-terminated prepolymer prior to the admixing of Parts A and B.

After the homogeneous admixing of Parts A and B, the final liquid pressure sensitive adhesive composition was cast onto a silicone resin-treated release paper in sufficient quantity to give the final in-situ formed thickness indicated and conditioned in a circulating hot air oven for ten minutes at 175° F. to remove the solvent and initiate the in-situ formation of the pressure sensitive adhesives. The pressure sensitive adhesive-coated side of the release paper, after cooling to room temperature, was then laminated to a plastic substrate web, which in Examples 1, 2 and 4 to 10 was a 2 mil film of biaxially oriented polyethylene terephthalate, and which in Example 3, was a 2 mil film polypropylene used as received, and the resulting laminate conditioned for at least an additional 48 hours at ambient temperature (22° to 25° C.) to complete the in-situ formation of the pressure sensitive adhesive prior to removing the release paper and testing the pressure sensitive adhesive-coated plastic web.

The tack, peel adhesion and creep resistance values for each example were obtained from test specimens that were prepared and tested as specified in test methods PSTC–6 for tack, ASTM D–903–49 for peel adhesion, and PSTC–7 for creep resistance. In the peel adhesion and creep tests, #304 stainless steel test panels were used and the laminated test specimens were conditioned 48 hours at 25° C. prior to testing. Peel adhesion was determined with an Instron Model 1130 tester and the reported values represent the average force required for separation. Creep resistance was determined with a 2 lb. load and in a $90° \pm 0.5°$ F. environment. Prior to testing, the creep test specimens were preconditioned for 24 hours at the $90 \pm 0.5$ test temperature.

Example 1 illustrates that a general purpose pressure sensitive adhesive of this invention having excellent peel adhesion can be made with a blend of a hydroxyl-terminated polybutadiene and a reactive polypropylene ether triol. Noteworthy is the use in Example 1 of 15 parts of Kodaflex AD–2 and 5 parts of Santicizer 160 for a total of approximately 20 parts by vinyl resin-type plasticizers per 100 parts of the in-situ formed elastomer component of the pressure sensitive adhesive to enhance tack, an expedient that is not possible with conventional pressure sensitive adhesives made with hydrocarbon polymers.

This pressure sensitive adhesive composition, when utilized on a plasticized polyvinyl chloride web or adherent surface, has demonstrated excellent resistance to plasticizer migration, showing less than a 20% decrease in peel adhesion on accelerated heat aging. By way of comparison, conventional pressure sensitive adhesives based on a hydrocarbon polymer will generally lose at least 50% of its original peel adhesion and, as a consequence, normally would not be suitable for such applications.

Example 2 illustrated the preparation of a pressure sensitive adhesive having an excellent balance of physical properties employing the prepol-mixing technique and sans any solvent. Because it is made with an aliphatic diisocyanate it exhibits better resistance to sunlight exposure than do the general purpose pressure sensitive adhesives of the prior art that are based on the hydrocarbon polymers.

As previously described, the adhesive composition of Example 3 was applied to a polypropylene web used as received and having no special primer to obtain adhesion to the adhesive layer. Even so, it exhibited excellent tack and creep resistance and adequate peel adhesion with failure occurring principally to the metal rather than to the polypropylene web. It was observed that the pressure sensitive adhesive of Example 3 exhibits excellent tack at low temperatures, for example 40° F. or lower, as compared to conventional polyacyrilic ester-based pressure sensitive adhesives. Further, the composition of Example 3 possesses excellent resistance to battery acid. The polypropylene web coated with the pressure sensitive adhesive composition of Example 3 when adhered to a rigid PVC substrate and preconditioned for 72 hours at 25° C. and 10 minutes at 175° F., exhibited only ⅟₃₂ to ⅟₁₆ inch of edge separation (undercutting) after being in contact with battery acid ($H_2SO_4$) for 7 days at 175° F., indicating its eminent suitability for battery labels. The best commercially available pressure sensitive adhesive products

TABLE OF EXAMPLES

| Part A | 1 | 2 | 3 | 4 | 5 | 6 | 7 | 8 | 9 | 10 |
|---|---|---|---|---|---|---|---|---|---|---|
| Poly B-D R-45M [1] | 70 | 58.8 | 58.8 | 70 | | | | | 70 | |
| Kraton 1107 [2] | | | | 75 | | | | | | 60 |
| Poly B-D CN-15 [3] | | | | | 70 | | | | | |
| Hycar CTBN [4] | | | | | | 70 | | | | |
| Hycar MTBN [5] | | | | | | | 70 | | | |
| Poly B-D CS-15 [6] | | | | | | | | 70 | | |
| Poly B-D R-45HT [7] | | | | | | | | | | 38 |
| Super Beckacite 2000 [8] | 80 | | | 80 | 80 | 80 | 80 | 80 | 80 | 40 |
| Foral 105 [9] | 32 | | | 40 | 40 | 40 | 40 | 40 | 22 | 104 |
| Piccolyte Alpha 115 [10] | | 100 | 35 | | | | | | | |
| Piccolyte Alpha 85 [11] | | | 140 | | | | | | | |
| Cellolyn 21 [12] | | | | 10 | | | | | | |
| Mondur O [13] | 0.9 | | | 0.9 | 0.5 | 0.5 | 0.5 | 0.5 | 0.9 | 2.7 |
| Thanol SF 1500 [14] | 20 | | | 20 | 20 | 20 | 20 | 20 | 20 | 20 |
| Isonol C-100 [15] | 2.8 | 0.5 | 0.5 | | | | | | 5.6 | 0.5 |
| Water | | | | 2.5 | | | | | | |
| EDBC [16] | | 8 | | 10 | | | | | 10 | 10 |
| Kodaflex AD-2 [17] | 15 | 15 | 15 | | | | | | 6.4 | 15 |
| Santicizer 160 [18] | | | 15 | | | | | | | |
| Shelflex 371N [19] | | | | | | | | | 40 | |
| Toluene | | | 162 | 50 | | | | | 14 | 50 |
| Heptane | | | 52 | | | | | | | |
| Methylethyl ketone | | | 10 | | | | | | | |
| Dibutyl Tindilaurate | 0.5 | 0.5 | 1.0 | 0.5 | 0.5 | 0.5 | 0.5 | 0.5 | 0.5 | 0.5 |
| Ethyl 330 [20] | | | 2 | | | | | | | |
| Uvinul N-539 [21] | | | 4 | | | | | | | |
| Part B | 1 | 2 | 3 | 4 | 5 | 6 | 7 | 8 | 9 | 10 |
| Arochlor 1254 [22] | | 30 | 10 | | | | | | | |
| Santicizer 160 [18] | 5 | | | | 15 | 15 | 15 | 15 | 12 | |
| Hylene W [23] | | 9.56 | 9.56 | | | | | | | |
| Isonate 390 P [24] | 16.2 | | | 25.8 | 12.4 | 12.4 | 12.4 | 12.4 | 13.65 | 12 |
| Piccolyte Alpha 115 [10] | | | | | | | | | | 52 |
| Foral 105 [9] | 18 | | | | | | | | 22.4 | |
| Poly B-D R-45 M [1] | | 31.20 | 31.20 | | | | | | | |
| Toluene | 10 | | 24 | | | | | | | 56 |
| Poly B-D R-45HT [7] | | | | | | | | | | 32 |
| Tack (inches) | 8 | 4.2 | 1.5 | 15 | 2 | 15 | 15 | 8 | 6 | 1.5 |
| Peel adhesion (p.l.i.) | 9.5 | 3.5 | 3.2 | 6.5 | 12.5 | 2 | 1.5 | 8.5 | 1.5 | 6.8 |
| Creep resistance (hrs.) | 95 | 171 | 300 | 300 | | | | | 15 | 150 |
| Gauge (mils) | 1.5 | 1.5 | 1.5 | 1.5 | 4 | 5 | 4.5 | 5 | 1.5 | 1.5 |

[1] Poly B-D R-45M—hydroxyl-terminated polybutadiene having equivalent weight of 1250 and an average of 2.1 to 2.3 hydroxyl groups per molecule.
[2] Kraton 1107—styrene-isoprene-styrene block copolymer having a Brookfield viscosity of 3000 cps. at a 25% total solids in toluene.
[3] Poly B-D CN-15—hydroxyl-terminated 85/15 butadiene acrylonitrile copolymer having an qeuivalent weight of 1667 and approximately two hydroxyl groups per molecule.
[4] Hycar CTBN—carboxyl-terminated butadiene-acrylonitrile copolymer having 19.4% bound acrylonitrile, and average molecular weight of 3270 and a functionality of 1.74.
[5] Hycar MTBN—thiol-terminated butadiene acrylonitrile copolymer having 24% bound acrylontrile, an average molecular weight of 1700 and a functionality of 1.6.
[6] Poly B-D CS-15—hydroxyl-terminated 75/25 butadiene-styrene copolymer having an equivalent weight of 1538 and approximately two hydroxyl groups per molecule.
[7] Poly B-D R-45HT—hydroxyl-terminated polybutadiene having an equivalent weight of 1358 and an average of about two hydroxyl groups per molecule.
[8] Super Beckacite 2000—polyterpene phenolic resin having a softening point of about 105° C.
[9] Foral 105—pentaerythritol ester of saturated abietic acid having a softening point of about 105° C.
[10] Piccolyte Alpha 115—alpha pinene resin having a softening point of about 115° C.
[11] Piccolyte Alpha 85—alpha pinene resin having a softening point of about 85° C.
[12] Cellolyn 21—hydroabietyl phthalate having a softening point of about 63° C.
[13] Mondur O—octdecyl isocyanate.
[14] Thanol SF-1500—propylene oxide adduct of glycerine having a equivalent weight of about 490.
[15] Isonol C-100—N,N-bis [2-hydroxyl propyl] aniline.
[16] EBDC—liquid polyvinyl ethyl ether (tacky plasticizer).
[17] Kodaflex AD-2—high molecular weight polymeric plasticizer having an acid number of 13, a refractive index, $n25°$ C/D of 1.4824, and a specific gravity 20/20 C of 1.041.
[18] Santicizer 160—butyl benzyl phthalate.
[19] Shelflex 371N—paraffinic mineral oil.
[20] Ethyl 330—1,3,5-trimethyl-2,4,6-tris (3,5-di-tert-butyl-4[hydroxybenzyl) benzene.
[21] Uvinul N-539—octyl 2,2-diphenyl-1-cyanoacrylate.
[22] Arochlor 1254—chlorinated biphenyl having 54% chlorine.
[23] Hylene W—4,4'-methylene bis (cyclohexylisocyante).
[24] Isonate 390 P—mixture of p,p' methylene diphenyl diisocyanate and polymethylene polyphenyl isocyanate having NCO content of about 32%.

recommended for battery labels (based on crosslinked acrylic ester copolymers) when similarly tested, had more than twice this amount of edge undercutting, viz 4/16 to 5/16 inch. Because of their ability to adhere to non-polar surfaces and their resistance to acid environments, invention pressure sensitive adhesive compositions of the type exemplified in Example 3, in which non-polar resins provide a major portion of the tackifying resins, constitute one of the preferred commercial embodiments of this invention.

Example 3 also illustrates that these advantages can be obtained even when a considerable portion, viz 43% of the pressure sensitive adhesive elastomer component is supplied by a diene elastomer. In this connection, it was observed that when a diene elastomer is employed, in the practice of this invention, more consistent pressure sensitive adhesive properties are obtained when it is predissolved in the diene telechelic polymer and/or solvents, if used, rather than in the organic polyisocyanate.

Example 4 illustrates that water can be used, if desired, in the formulation of the pressure sensitive adhesives of this invention when special properties are required. The pressure sensitive adhesive of Example 4 because of its low tack permits the production of pressure sensitive adhesive products that can be slidably positioned on an adhered surface and yet give a high order of ultimate peel adhesion and creep resistance. While more than one equivalent weight of water per equivalent weight of the diene telechelic polymer and reactive polyether was present in Example 4, only about one equivalent weight was reacted because of the limited quantity of polyisocyanate, viz 2 equivalents, employed which, because of the catalyst used, preferentially reacted first with the hydroxyl groups present.

Examples 5 and 8 demonstrate that satisfactory pressure sensitive adhesives can be made from hydroxyl-terminated, random diene copolymers, when desired, in place of the diene homopolymers; Example 5 being made with a dihydroxyl-terminated copolymer of butadiene containing approximately 15% of randomly copolymerized acrylonitrile, while Example 8 was derived from a dihydroxyl-terminated butadiene copolymer containing about 25% of randomly copolymerized styrene.

Examples 6 and 7 further demonstrate the use of random copolymers in the pressure sensitive adhesives of this invention and, in addition, illustrate the suitability of carboxyl groups and mercaptan (thiol) groups for co-reaction with the polyisocyanate in the in-situ formation of the pressure sensitive adhesive after being cast on the substrate web.

Example 9 illustrates the versatility and formulating latitude possessed by the pressure sensitive adhesives of this invention. Because of this the adhesive technologist can formulate the pressure sensitive adhesive of this invention to provide a wide spectrum of properties to meet the specification requirements of a number of different end-use applications. In particular, the pressure sensitive adhesive of Example 9 was formulated with a considerable quantity of a paraffin mineral oil to provide an adhesive having reduced tack and peel adhesion with reasonable retention of creep resistance, a balance of properties especially desirable for removal pressure sensitive adhesive products. In contradistinction, conventional hydrocarbon pressure sensitive adhesives when so formulated exhibit less than one hour of creep resistance.

Example 10 illustrates a second formulation employing a diene elastomer in the pressure sensitive adhesives of this invention and particularly, the increased factory processing speeds that can be achieved with its use. With the composition of Example 10, it is possible to apply an adhesive layer at a coating weight of 2 gms./100 in.$^2$ of substrate at speeds of up to 150 feet per minute employing as the solvent-evaporation means, high intensity infrared heaters having a length of only six feet, and a further run of 9 feet for cooling prior to wind-up. Conventional pressure sensitive adhesives based on solid elastomers, on the other hand, typically cannot be run at this coating weight at a speed much in excess of about 90 feet per minute when dried in the circulating hot air ovens of 100 to 150 feet length commonly used in the pressure sensitive adhesive industry. Because of this reduced length of the heating means required by the invention process when solvents are employed, substrate web scrap losses are reduced, typically to 3% or less as compared to the 7 to 10% that are common in today's pressure sensitive adhesive production. Further, it is manifest that the reduced length of the heating means and/or increased speed that are typical in the production of the invention pressure sensitive adhesives significantly reduces the capital investment required to practice the invention and hence lower fixed costs assessed to amortization.

The pressure sensitive adhesive composition of the present invention achieves its final properties of a viscoelastic pressure sensitive adhesive mass by the controlled chain extension, branching, and cross-linking of certain liquid, active hydrogen terminated elastomers by di-isocyanates or poly-isocyanates in the presence of a high concentration of tackifying resins. By controlling chain extension, cross-linking, branching, resin composition, resin concentration, other additives, and other factors, the formulator has at his disposal, sufficient sophisticated controls to enable him to tailor this system to many diversified applications that require special properties with respect to specific adhesion, peel, creep, tack, and other functional characteristics.

From the foregoing description and examples, it can be seen that this invention provides the adhesive technologist with a unique new class of pressure sensitive adhesives that is capable of providing a spectrum of properties previously unattainable with the compositions known to the prior art. Particularly unique and valuable is the capability of the invention to provide pressure sensitive adhesives having a desirable balance of properties for a wide variety of applications running the gamut from removal to permanent pressure sensitive adhesive products that, depending on its formulation, adhere to either polar or non-polar surfaces, having low to high tack and low to high peel adhesion all with superior creep resistance, and exhibiting these properties over a wide temperature range and under a variety of potentially degrading environmental conditions.

Further, it has been demonstrated that the pressure sensitive adhesives of this invention permit the use of production processes that minimize and in some cases obviate the problems and disadvantages of the solvent process most widely used by the pressure sensitive adhesive industry. Even when solvent is used in the process of this invention, it has been shown that half or less of the quantity customarily employed by the solvent pressure sensitive adhesive process will normally be required. Additionally, it has been shown that, because more than half of the film-former in the invention pressure sensitive adhesive are low-molecular-weight materials at the time of solvent removal, solvent evaporation rates can be many times faster thus minimizing the length and cost of solvent removable means and at the same time, because of the reduced length of the solvent removing means, dramatically reducing the production of off-spec products.

All of these advantages and objectives have been achieved with materials that have been known and available to the art for a number of years prior to applicant's invention. In particular, typical diene telechelic polymers employed in applicant's invention and suggested uses including adhesives are generally shown in U.S. Patent 3,427,366, assigned to Sinclair Research, as well as Product Data Bulletin #505, revised June 1967 published by Sinclair Petrochemicals Inc. Further illustrating isocyanate-reactive polymers and products made therefrom are the teachings contained in U.S. Patents 3,190,848; 3,245,954; 3,381,861 and 3,392,154 and British Patent 574,901. A class of diene elastomers and tackifying resins for pressure sensitive adhesives are shown in U.S. Patent 3,239,478.

While a full and complete description of the invention has been presented, other modifications based on these teachings within the spirit and scope of the following claims will be apparent to those skilled in the art and is meant to be covered thereby.

What is claimed is:

1. An elastomer-based, pressure-sensitive adhesive composition having an improved balance of physical and chemical properties characteristics including improved peel adhesion, tack, and creep resistance characteristics together with the capability to selectively vary such characteristics, said composition being adapted for formation in situ on a substrate by the chemical formation of an elastomer base material in the presence of a tackifying resin material, said composition comprising (I) an elastomer base material which is adapted for chemical formation in situ on said substrate and which comprises the reaction product of:

(A) an isocyanate-reactive component having isocyanate-reactive functionality and which includes a liquid diene telechelic polymer material having an average of at least about 1.6 essentially terminal, isocyanate-reactive functional groups per polymer molecule, each of said essentially terminal functional groups being attached to one of the last three carbon atoms at an end of the polymer molecule, and a coreactive component having isocyanate functionality and which includes an organic polyisocyanate material capable of coreacting with said isocyanate-reactive functional groups of said diene telechelic polymer material, said polyisocyanate material having an average number of isocyanate functional groups greater than one, said isocyanate functional groups being reactive with the isocyanate-reactive functional groups of the diene telechelic polymer material to increase the average molecular weight and modify molecular structure of the diene telechelic polymer material, the ratio of isocyanate functional groups to isocyanate-reactive functional groups being in the range from about .75 to 1 to about 1.2 to 1,
in the presence of
(II) a tackifying resin material,
said tackifying resin material being present in the amount of at least about 75 parts by weight of tackifying resin material per 100 parts by weight of elastomer material, and said tackifying resin material being sufficiently compatible with said elastomer material that said tackifying resin material is soluble in said reactive component at 25° C., so that said tackifying resin renders said elastomer material tacky.

2. An adhesive composition according to claim 1 wherein said tackifying resin material is selected from the group consisting of:
(a) rosin, including derivatives thereof,
(b) oil-soluble, phenolaldehyde resin,
(c) terpene phenolic resin,
(d) polymerized pinene,
(e) polymerized $C_5$ hydrocarbon resin, and
(f) ketone-formaldehyde condensate.

3. An adhesive composition according to claim 1 wherein said diene telechelic polymer material is selected from a group consisting of:
(a) hydroxyl-terminated polybutadiene,
(b) hydroxyl-terminated butadiene acrylonitrile copolymer,
(c) carboxyl-terminated butadiene acrylonitrile copolymer,
(d) thiol-terminated butadiene acrylonitrile copolymer,
(e) hydroxyl-terminated butadiene-styrene copolymer, and
(f) mixtures thereof.

4. An adhesive composition according to claim 1 wherein said tackifying resin material is selected from the group consisting of:
(a) polyterpene phenolic resin,
(b) pentaerythritol ester of saturated abietic acid,
(c) alpha pinene resin,
(d) hydroabietyl phthalate, and
(e) mixtures thereof.

5. A pressure sensitive adhesive composition according to claim 1 wherein
said adhesive composition includes a high molecular weight, polymeric, solidification agent which is a solid elastomeric polymer which is capable of reversible elongation,
said solidification agent being present in an amount up to about 90 parts by weight per 100 parts by weight of said elastomer material.

6. An adhesive composition according to claim 5 wherein said solidification agent is selected from the group consisting of:
(a) styrene-butadiene block copolymer with the styrene segment terminally located,
(b) a styrene-butadiene block copolymer with the butadiene segment terminally located,
(c) a styrene-isoprene block copolymer with the styrene segment terminally located,
(d) a styrene-isoprene block copolymer with the isoprene segment terminally located,
(e) a natural rubber,
(f) a polyisoprene, and
(g) a random copolymer of sytrene and butadiene having a Mooney viscosity from about 35 to about 90 (ML-4 minutes at 212° F.).

7. An adhesive composition according to claim 5 wherein said solidification agent comprises a styrene-isoprene-styrene block copolymer having styrene termination.

8. A pressure sensitive adhesive composition according to claim 1, wherein said liquid diene telechelic polymer material is a liquid diene telechelic polymer which contains, by weight:
(a) from about 67% to 100% by weight of polymerized diene monomer, and
(b) from 0% to about 33% by weight of copolymerized vinyl monomer which is essentially free of isocyanate-reactive, active hydrogen groups.

9. An adhesive composition according to claim 8, wherein
said diene monomer is selected from the group consisting of:
(1) butadiene,
(2) isoprene,
(3) chloroprene,
(4) piperylene, and
(5) mixtures thereof; and
said vinyl monomer is selected from the group consisting of:
(1) acrylonitrile,
(2) methacrylonitrile,
(3) methacrylamide,
(4) methyl methacrylate,
(5) ethyl acrylate,
(6) a styrene,
(7) vinyl pyridine, and
(8) mixtures thereof.

10. An adhesive composition according to claim 1, wherein said isocyanate-reactive function groups are selected from the group consisting of:
(a) a hydroxyl group,
(b) a mercaptan group,
(c) a carboxyl group, and
(d) an amino group.

11. An adhesive composition according to claim 1, wherein said organic polyisocyanate material is selected from the group consisting of:
(a) an aromatic polyisocyanate,
(b) an aliphatic polyisocyanate, and
(c) a cycloaliphatic polyisocyanate.

12. An adhesive composition according to claim 1, wherein said organic polyisocyanate material is selected from the group consisting of:
(a) 2,4-toluene diisocyanate;
(b) 2,6-toluene diisocyanate;
(c) p-phenylene diisocyanate;
(d) 4',4-biphenylene diisocyanate;
(e) p,p'-methylene diphenyl diisocyanate;
(f) polymethylene polyphenyl isocyanate;
(g) triphenylmethane tri-isocyanate;
(h) hexamethylene diisocyanate;
(i) methylene dicyclohexyl-4,4'-diisocyanate; and
(j) mixtures thereof.

13. An adhesive composition according to claim 1, wherein
said isocyanate-reactive component includes a reactive polymer material having isocyanate-reactive functional groups selected from the group consisting of:
(a) a reactive polyester material having isocyanate-reactive functional groups, and
(b) a reactive polyether material having isocyanate-reactive functional groups, and
said reactive polymer material being miscible with said diene telechelic polymer material.

14. An adhesive composition according to claim 13, wherein
said reactive polyester material is selected from the group consisting of (1) the reaction product of the condensation of a polyol selected from the group consisting of:
(a) ethylene glycol,
(b) 1,4-butanediol,
(c) isopropylene glycol, and
(d) glycerine, and a polycarboxylic acid selected from the group consisting of:
(a) succinic acid,
(b) adipic acid
(c) sebacic acid,
(d) phthalic acid,
and (2) polyester derived from the polymerization of caprolactone.

15. An adhesive composition according to claim 13, wherein said polyether material is selected from the group consisting of:
(a) polyethylene-propylene ether,
(b) polypropylene ether, and
(c) polytetramethylene ether.

16. An adhesive composition according to claim 13, wherein said reactive polyether material comprises a propylene oxide adduct of glycerine.

17. An adhesive composition according to claim 1, wherein said isocyanate-reactive component includes a low molecular weight, reactive molecular weight increasing agent having isocyanate-reactive functionality selected from the group consisting of:
(a) a chain extending agent having isocyanate-reactive funtionality, and
(b) crosslinking agent having isocyanate-reactive functionality.

18. An adhesive composition according to claim 17, wherein said molecular weight increasing agent is selected from the group consisting of:
(a) ethylene glycol,
(b) 1,4-butanediol,
(c) 1,4-cyclohexane glycol,
(d) trimethylol propane,
(e) pentaerythritol,
(f) N,N-bis(2-hydroxypropyl)aniline,
(g) adipic acid,
(h) succinic acid,
(i) terephthalic acid,
(j) ethanol amine,
(k) piperazine,
(l) hydrazine,
(m) propylene diamine,
(n) 4,4'-methylene bis(2-chloro aniline),
(o) 3,3'-dichloro benzidine,
(p) 4,4'-diamino-diphenyl methane,
(q) 2,4-toluene diamine, and
(r) 2,6-toluene diamine.

19. An adhesive composition according to claim 1, wherein said adhesive composition includes a plasticizer material.

20. An adhesive composition according to claim 19, wherein said plasticizer is selected from the group consisting of:
(a) a polyvinyl, ethyl ether,
(b) a high molecular weight polymeric plasticizer,
(c) butyl benzyl phthalate,
(d) a paraffinic mineral oil, and
(e) mixtures thereof.

21. A pressure sensitive adhesive composition according to claim 1, wherein
said isocyanate-reactive component includes the reaction product of:
(a) a liquid diene telechelic polymer having isocyanate-reactive functional groups, and
(b) a monofunctional organic regulating compound having a single isocyanate functional group; and
said coreactive component includes a quantity of said polyisocyanate material in an amount which is stoichiometrically sufficient to preserve said ratio of isocyanate functional groups to isocyanate-reactive functional groups in said range.

22. An adhesive composition according to claim 21, wherein said monofunctional regulating compound comprises octadecyl isocyanate.

23. A pressure sensitive adhesive composition according to claim 1, wherein
said coreactive component includes the reaction product of:
(a) an organic polyisocyanate material having isocyanate-functional groups, and
(b) a monofunctional organic regulating compound having a single isocyanate-reactive functional group; and
said isocyanate-reactive component includes a quantity of said liquid diene telechelic polymer material in an amount which is stoichiometrically sufficient to preserve said ratio of isocyanate functional groups to isocyanate-reactive functional groups in said range.

24. A pressure sensitive adhesive composition according to claim 1, wherein
said isocyanate-reactive component includes the reaction product of:
(a) a liquid diene telechelic polymer having isocyanate-reactive functional groups, and
(b) a monofunctional organic regulating compound having a single isocyanate functional group;
said coreactive component includes the reaction product of:
(a) an organic polyisocyanate having isocyanate functional groups, and
(b) a monofunctional organic regulating compound having a single isocyanate-reactive functional group;
said coreactive component includes a quantity of said organic polyisocyanate material in an amount which is stoichiometrically sufficient to preserve said ratio of isocyanate functional groups to isocyanate-reactive functional groups in said range; and
said isocyanate-reactive component includes a quantity of liquid diene telechelic polymer material in an amount which is stiochoimetrically sufficient to preserve said ratio of isocyanate functional groups to isocyanate-reactive functional groups in said range.

25. An adhesive composition according to claim 1, wherein
said reactive component includes water, and
said isocyanate-coreactive component includes a sufficient quantity of a polysiocyanate to generate a polymer in situ.

26. An adhesive composition according to claim 1, wherein said organic polyisocyanate material is selected from the group consisting of:
(a) 4,4'-methylene bis(cyclohexylisocyanate),
(h) p,p'-methylene diphenyl diisocyanate,
(c) polymethylene polyphenyl isocyanate, and
(d) mixtures thereof.

References Cited

UNITED STATES PATENTS

| 3,246,049 | 4/1966 | Webber | 260—829 |
| 3,437,622 | 4/1969 | Dahl | 260—24 |
| 3,584,075 | 6/1971 | Bock et al. | 260—858 |
| 3,607,976 | 9/1971 | Hsieh | 260—859 |

FOREIGN PATENTS

| 772,222 | 11/1967 | Canada | 260—77.5 |

OTHER REFERENCES

Poly B-D Liquid Resins, Sinclair Petrochemicals, Inc., New York, N.Y., product data bulletin No. 505, issued May 1, 1965, pp. 1–7, 9, 12, 13, 21–24 and 41–46.

DONALD E. CZAJA, Primary Examiner

R. W. GRIFFIN, Assistant Examiner

U.S. Cl. X.R.

117—122 PA, 122 P; 156—230, 278; 260—33.6 AQ, 33.6 UB, 844, 845, 859 R, 859 PV, 887